United States Patent
Vogel et al.

(10) Patent No.: US 8,277,053 B2
(45) Date of Patent: Oct. 2, 2012

(54) INDOOR PROJECTION OF AN AIRCRAFT

(75) Inventors: Carsten Vogel, Hamburg (DE); Tilo Budinger, Hamburg (DE); Ulrich Kunkel, Altenbeken (DE)

(73) Assignee: Airbus Operations GmbH (DE)

( * ) Notice: Subject to any disclaimer, the term of this patent is extended or adjusted under 35 U.S.C. 154(b) by 349 days.

(21) Appl. No.: 12/663,873

(22) PCT Filed: Jun. 5, 2008

(86) PCT No.: PCT/EP2008/056972
§ 371 (c)(1),
(2), (4) Date: Dec. 10, 2009

(87) PCT Pub. No.: WO2008/151977
PCT Pub. Date: Dec. 18, 2008

(65) Prior Publication Data
US 2010/0214496 A1    Aug. 26, 2010

Related U.S. Application Data

(60) Provisional application No. 60/934,633, filed on Jun. 14, 2007.

(30) Foreign Application Priority Data

Jun. 14, 2007 (DE) .................. 10 2007 027 420

(51) Int. Cl.
G03B 21/26 (2006.01)
G03B 21/14 (2006.01)
G09G 5/00 (2006.01)
G06K 9/40 (2006.01)

(52) U.S. Cl. ............... 353/94; 353/13; 353/12; 353/30; 353/121; 353/69; 345/647; 382/275

(58) Field of Classification Search ............. 353/94, 353/13, 12, 30, 121, 69; 345/647; 382/275
See application file for complete search history.

(56) References Cited

U.S. PATENT DOCUMENTS

| 6,219,099 B1 * | 4/2001 | Johnson et al. ............ 348/383 |
| 6,709,116 B1 | 3/2004 | Raskar et al. |
| 6,793,350 B1 * | 9/2004 | Raskar et al. ............. 353/121 |
| 7,070,150 B2 | 7/2006 | Jones et al. |
| 2002/0008697 A1 | 1/2002 | Deering |
| 2003/0052837 A1 | 3/2003 | Raskar |
| 2003/0193651 A1 | 10/2003 | Egle |
| 2008/0095468 A1 | 4/2008 | Klemmer et al. |

FOREIGN PATENT DOCUMENTS

DE    19506648 A1    8/1996
(Continued)

Primary Examiner — Georgia Y Epps
Assistant Examiner — Magda Cruz
(74) Attorney, Agent, or Firm — Lerner, David, Littenberg, Krumholz & Mentlik, LLP

(57) ABSTRACT

A projection method and projection device for projecting an overall image to interior walls of an aircraft, in which method or device the boundary regions of several partial images of an overall image to be presented are matched correspondingly, and partial images are pre-distorted in order to, in this way, obtain a large-area non-distorted image presentation even in the case of complex geometric shapes of projection areas, in which image presentation the transition regions of partial images are at least perceptible only to a limited extent.

18 Claims, 6 Drawing Sheets

FOREIGN PATENT DOCUMENTS

| | | |
|---|---|---|
| DE | 19822878 A1 | 11/1999 |
| DE | 10035040 A1 | 2/2002 |
| DE | 10202325 B4 | 8/2003 |
| DE | 10215893 C1 | 10/2003 |
| EP | 1039749 A1 | 9/2000 |
| EP | 1677528 A1 | 7/2006 |
| WO | 0018138 A1 | 3/2000 |
| WO | 0219704 A2 | 3/2002 |
| WO | 2006024254 A1 | 3/2006 |

* cited by examiner

INDOOR PROJECTION OF AN AIRCRAFT

CROSS-REFERENCE TO RELATED APPLICATIONS

This application is a national phase entry under 35 U.S.C. §371 of International Application No. PCT/EP2008/056972, filed Jun. 5, 2008, published in English, which claims the benefit of the filing date of U.S. Provisional Patent Application No. 60/934,633 filed Jun. 14, 2007 and of German Patent Application No. 10 2007 027 420.5 filed Jun. 14, 2007, the disclosures of which applications are hereby incorporated herein by reference.

FIELD OF THE INVENTION

The present invention relates to a method and a device for indoor projection for aircraft, and in particular to a method and a device for indoor projection of composite images onto interior walls and ceilings of cabins in commercial aircraft.

BACKGROUND OF THE INVENTION

In commercial aircraft and in particular in long-range aircraft it is desirable to design the cabin layout so that passengers find their time on board the aircraft more agreeable, in particular so as to create a generous spatial effect in the aircraft interior. For this purpose, projection and illumination scenarios are used that give passengers the impression of generous interior space. In this way, passengers are made to believe in a virtual reality, which by the projection of images and films gives passengers the impression of being in a more generous and more spacious cabin environment.

U.S. Pat. No. 7,070,150 B2 proposes a method and a system for the presentation of moving simulated images in a vehicle, in which method and system in a so-called blended wing-body aircraft, which for design reasons no longer comprises any passenger windows, images moving on virtual window areas are played to passengers such that they gain the impression of looking out of a real window instead of looking at a projection surface. In this arrangement, based on the real transverse inclination of the aircraft, a changed horizon is played to passengers so that a virtual horizon is presented to passengers, which virtual horizon agrees with their bodies' inclined position as perceived.

As a rule, a realistic presentation of virtual reality ends for the spectator at the boundary of the presented image of the virtual reality. However, known displays and projection devices for aircraft have only a limited size or limited projection area so that, as a rule, to a passenger the virtual reality ends at the boundary of the image projected or presented by an individual projector. This gives rise to the necessity of combining several individual images such that a viewer perceives a continuous overall image, in which a viewer is meant to perceive neither the boundaries between the partial images nor any distortion as a result of unfavourable installation positions in an aircraft.

PRESENTATION OF THE INVENTION

The present invention provides a projection method and a projection device which in a spatially limited interior of an aircraft make possible a realistic presentation of large-area images.

According to an exemplary embodiment of the invention, a projection method for projecting an overall image onto interior walls of an aircraft is provided, with the projection method comprising determination of a boundary region of each one of at least two partial images of an overall image; matching the boundary regions to each other such that in a presentation of the partial images the transition between the partial images is perceptible only to a reduced extent; and pre-distorting the partial images on the basis of a geometric shape of a projection area such that during presentation of the partial images on the projection area distortion is perceptible only to a reduced extent.

In this way from a number of partial images an overall image can be put together, wherein the partial images in the margin- and boundary regions in which they adjoin are matched to each other such that the boundary region or the transition between two partial images is perceptible to a user only to a reduced extent or is no longer perceptible at all. Such matching can take place due to a gradual transition of brightness, due to taking into account the contrasts, or due to matching contour gradients in the boundary regions. For example, in order to present a line that appears in the overall image beyond the boundaries of the partial images, it is possible to carry out matching of the image content in the boundary regions in order to give the viewer the impression of perceiving a continuous line in the overall image. By pre-distorting the partial images based on the geometric shape of a projection area, the partial images are pre-distorted such that they counteract the expected distortion of the projection surface. In this way distortion is then perceptible only to a reduced extent or is no longer perceptible at all. The order of matching the boundary regions and of pre-distorting the partial images is in principle unimportant to the method according to the invention, except that a particular order can be observed if this is required by the particular technical circumstances and prerequisites in order to optimise the quality of the presentation of the overall image.

According to an exemplary embodiment of the invention, the projection method furthermore comprises separation of an overall image into at least two partial images.

In this way it is possible to put together not only fed-in partial images, but also to process an overall image with the projection method according to the invention, wherein the overall image can be separated into any desired number of partial images. In this way it is possible to provide a conventional overall image for the projection method, which overall image is then further processed, starting with separation, by the projection method in order to in this way be prepared for the individual presentation of partial images.

According to an exemplary embodiment of the invention, matching the boundary regions takes place prior to pre-distorting the partial images.

In this way, matching the boundary regions can be undertaken more easily without there being a need, for matching the boundary regions, to take into account any pre-distortion that has already taken place.

According to an exemplary embodiment of the invention, the projection method further comprises projecting the partial images onto a projection area, wherein each partial image is projected with an associated projector.

In this way the entire image processing task can be handled by the projection method according to the invention, and merely by providing an overall image a suitable and optimal presentation of the overall image by the sum of the partial images can be achieved.

According to an exemplary embodiment of the invention, the projection method further comprises acquiring the entire projection of the partial images; comparing the entire projection of the partial images with the overall image; and controlling at least one of the processes of matching the boundary regions, positioning the partial images, or pre-distorting the partial images, such that the entire projection of the partial images is matched to the overall image.

In this way a self-regulating projection method can be provided which, for example by pattern recognition, compares the projected image region with the overall image in order to in this way, for example, detect inadequate transitions, incorrect pre-distortions or incorrect positioning relative to one another and to compensate for the above in a corresponding manner. It is understood that during acquisition any distortion that may be caused by the position of an acquisition device relative to a projection area can be taken into account for the evaluation.

According to an exemplary embodiment of the invention, in each case at least two partial images have a coincident region, wherein the coincident region forms part of the boundary region so that the boundary region at least in part is a region of overlap.

In this manner, matching of the partial images in an overlapping region can be carried out, and the corresponding boundary region may be selected so that it is narrow, because matching becomes possible on each of the two partial images without essentially losing image contents of the partial images. Furthermore, brightness matching can be carried out in the overlapping region.

According to an exemplary embodiment of the invention, at least two partial images together comprise a matching region, wherein the matching regions are a continuation of the image content, and the matching region forms part of the boundary region so that the boundary region is at least in part a joining region.

In this way partial images that do not overlap but merely abut at the edges can be matched to each other, wherein matching in the boundary region is carried out such that the image contents present in that location are matched to each other such that when the overall image is shown, a continuation of the image content beyond the boundary of the partial images continues to be possible. Such matching can, for example, also comprise distortion of the image contents in the boundary regions so that, for example, contours at a transition of two adjacent partial images make a gradual transition. As a rule, a viewer will perceive a corresponding distortion to be less disturbing than is the case with a discontinuity of a contour in the boundary region.

According to an exemplary embodiment of the invention, in the case of matching the boundary regions, matching takes place to a degree that depends on the distance between partial boundary regions and an associated partial image margin.

In this way, for example in the case of overlapping partial images, the partial boundary region that is distant from the partial image margin can undergo lesser matching, while the congruent partial boundary region of an adjacent partial image, which partial boundary region is situated closer to the associated partial image margin of the corresponding partial image, undergoes greater matching. In this way a more gentle and softer transition of the partial images can be achieved in the regions of overlap.

According to an exemplary embodiment of the invention, the projection method is repeated and carried out in an image-precise manner with each one of a sequence of overall images such that a synchronised overall image presentation is made possible.

In this way the projection method can be used not only for presenting static images but also for presenting dynamic images, in particular films, wherein the entire image content or film content can be presented by a multitude of projectors in the form of partial image regions or partial film regions such that an observer notices neither the transition between the partial images nor any distortion due to the geometric shape of the projection surface.

According to an exemplary embodiment of the invention, a program element is provided which, when executed on a processor, implements the method according to the invention.

In this way the method according to the invention can be carried out by a computer-assisted system which, for example, supports fast image processing and fast matching and regulating of the steps necessary as a result of the method.

According to an exemplary embodiment of the invention, a computer-readable medium is provided on which a program element according to the invention is stored.

This makes it possible, in particular, to transport the method so that the method can without any problem also be operated on systems which up to now were not intended for such a method.

According to an exemplary embodiment of the invention, a projection device for projecting an overall image onto interior walls of an aircraft is provided, with a determination device that is designed to determine a boundary region of each one of at least two partial images of an overall image, a matching device that is designed for matching the boundary regions to one another such that in the presentation of the partial images the transition between the partial images is perceptible only to a reduced extent, and comprising a pre-distortion device that is designed to pre-distort the partial images based on the geometric shape of a projection area such that in the presentation of the partial images on the projection area distortion is perceptible only to a reduced extent.

In this way by the projection device according to the invention, larger overall images can be reproduced by presenting individual partial images such that neither the transitions between the partial images nor any distortion due to the geometric shape of a projection surface relative to a projection device are perceptible.

According to an exemplary embodiment of the invention, an aircraft comprising a projection device according to the invention is provided.

It should be pointed out that the above-mentioned, and also the following, explanations equally apply to the method, to the device, to the aircraft or aeroplane, to the program element and to the computer-readable medium.

Furthermore, it should be pointed out that the individual features can of course also be combined, as a result of which, in part, advantageous effects may arise which exceed the sum of the individual effects.

These and other aspects of the present invention are explained and clarified with reference to the exemplary embodiments described below.

BRIEF DESCRIPTION OF THE DRAWINGS

Below, exemplary embodiments of the invention are described with reference to the following drawings.

DETAILED DESCRIPTION OF EXEMPLARY EMBODIMENTS

Figure 1:
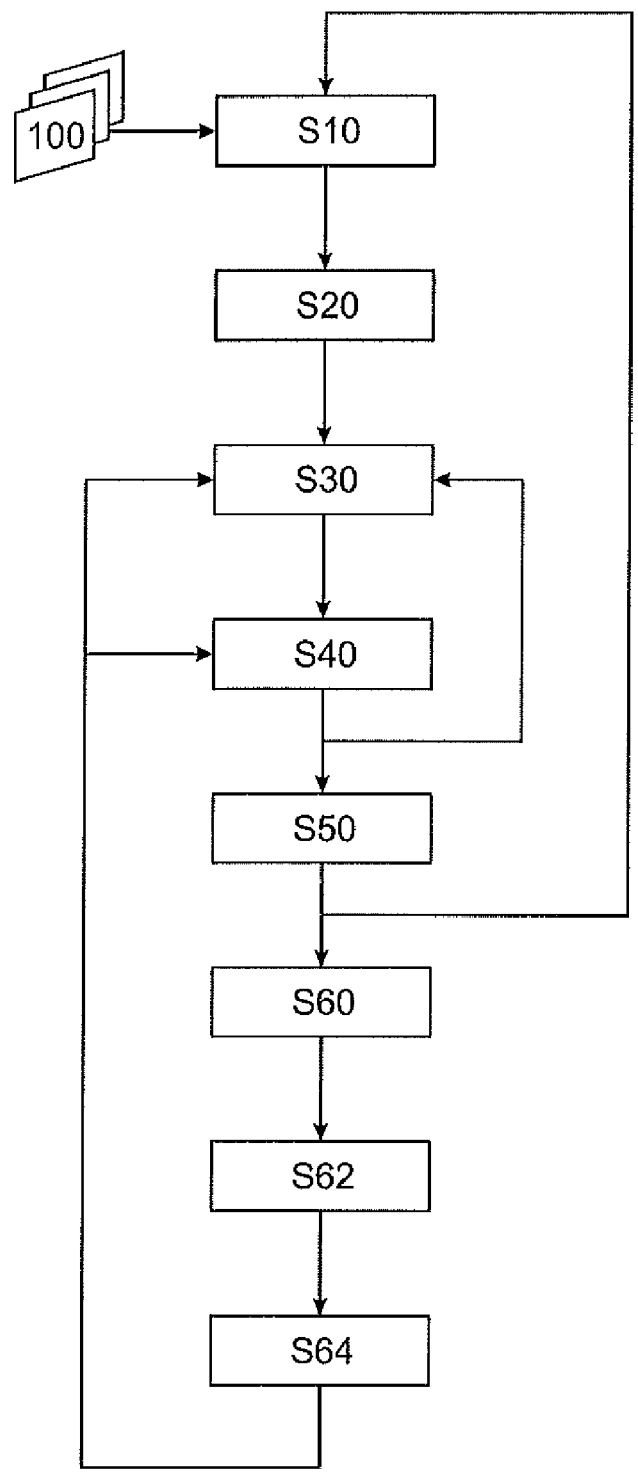
FIG. 1 shows a flow chart of an exemplary embodiment of the method according to the invention.

FIG. 1 shows an exemplary flow chart of a projection method according to an exemplary embodiment of the invention.

According to an exemplary embodiment, the projection method for projecting an overall image 100 to interior walls 6 of an aircraft 5 comprises determining S20 a boundary region 111, 121 of each one of at least two partial images 110, 120 of an overall image 100. In this arrangement, determining S20 a boundary region 111, 121 can be preceded by separation S10 of an overall image into at least two partial images 110, 120. To this effect, for carrying out the projection method, an overall image 100 or a sequence of overall images 100 is provided. After separation of the overall image, or of each overall image, of a sequence of overall images 100, on this basis a boundary region 111, 121 of each of the partial images is determined, preferably the boundary regions at which the partial images 110, 120 adjoin or overlap. These boundary regions 111, 121 are matched S30 such that in a presentation of the partial images 110, 120 the transition between the partial images 110, 120 is perceptible only to a reduced extent, or, ideally, is not perceptible at all. Furthermore, pre-distortion S40 of the partial images 110, 120 is carried out, namely on the basis of the geometric shape of a projection area 7 so that when the partial images are presented on the projection area 7 distortion is perceptible only to a reduced extent or ideally not at all. It should be noted that the method-related steps of matching S30 the boundary regions, and pre-distorting S40 the partial images can also take place in reverse sequence, wherein furthermore iteration can also be provided so that, for example, after pre-distortion S40 of the partial images, renewed matching S30 of the boundary regions can take place. The geometric shape of the projection area 7 can be determined by feeding-in fixed geometric data, or by scanning and acquisition of the projection surfaces.

The sequence of matching the boundary regions S30 and of pre-distorting the partial images S40 is provided according to the technical circumstances so that either matching and then pre-distorting occurs, or first pre-distorting and then matching. In a method-related sequence in which matching S30 of the boundary regions is followed by pre-distorting S40 the partial images, there is no need to undertake computing-intensive matching of already pre-distorted partial images, so that in such a sequence simpler processing of the image information can take place.

Furthermore, the projection method comprises projecting S50 the partial images 110, 120 onto a projection area 7, wherein each partial image 110, 120 is projected with an associated projector 51, 52. Of course, it is also possible to provide more than two partial images and thus also more than two projectors.

Furthermore, according to an exemplary embodiment of the projection method, acquisition S60 of the entire projection of the partial images, in other words of the entire projected image, can take place, wherein by subsequent comparing S62 of the entire projection of the partial images with the provided overall image 100 a regulating base can be provided, on the basis of which by a regulating step S64 for example modification of matching S30 the boundary regions or of pre-distorting S40 the partial images can take place so that the entire projection of the partial images 110, 120 is matched to the overall image 100 to be projected. In this way, for example, incorrect boundary region matching, incorrect distortions or incorrect positioning of the partial images can be compensated for. For this purpose it is, for example, possible to provide a positioning device (not shown) by which the individual projectors can be influenced such that a better matched position of the partial images occurs. In this case, regulating also intervenes optionally in the positioning process, which is, however, not shown in FIG. 1.

Figure 2:
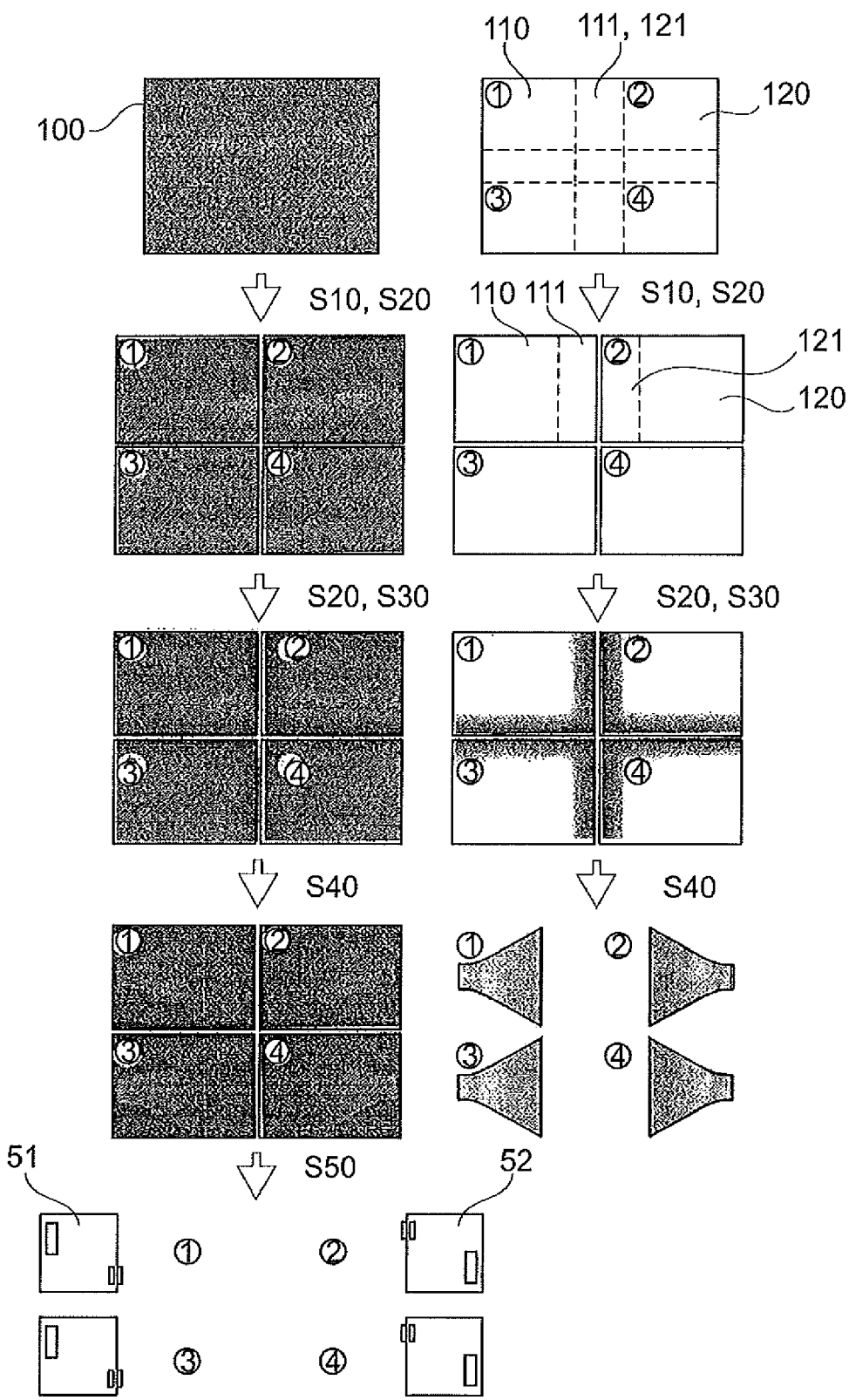
FIG. 2 shows the systematic sequence of the projection method according to an exemplary embodiment with reference to exemplary images.

FIG. 2 shows a systematic sequence of the projection method according to an exemplary embodiment of the invention. An overall image 100 is divided into at least two partial images 110, 120. FIG. 2 shows an exemplary embodiment comprising a total of four partial images whose corners comprise the encircled numbers 1, 2, 3 and 4. In this way the overall image 100 is separated S10 into the partial images 110, 120, and boundary regions 111, 121 are determined S20. After the boundary regions of the partial images 110, 120 have been determined, the partial images are then matched in their boundary regions 111, 121. For the sake of clarity, FIG. 2 only shows the boundary regions 111, 121 of the two partial images 110, 120, by which boundary regions 111, 121 said partial images 110, 120 adjoin. However, it is understood that the boundary regions of the other partial images are also matched to each other, although FIG. 2 does not explicitly show this. The partial images with the matched boundary regions are subsequently pre-distorted S40 so that on this basis in one projection step S50 the projectors 51 and 52 are fed with the pre-distorted partial images whose boundary regions have been matched. In this way corresponding ceiling projection or internal wall projection in an aircraft can be undertaken, in which projection a viewer perceives both the transitions between the partial images and any distortion only to a reduced extent, ideally no longer at all. The description with reference to FIG. 2 takes place on the basis of a total of four partial images shown in FIG. 2. However, it is understood that the method can also be implemented with any number of partial images, and that it is also possible to subject two or more boundary regions of a partial image to matching, in particular it is possible that in the case of multiple coverage, as occurs in the intersecting region of the partial images 1, 2, 3, 4, corresponding matching can take place taking into account quadruple coverage.

Figure 3:
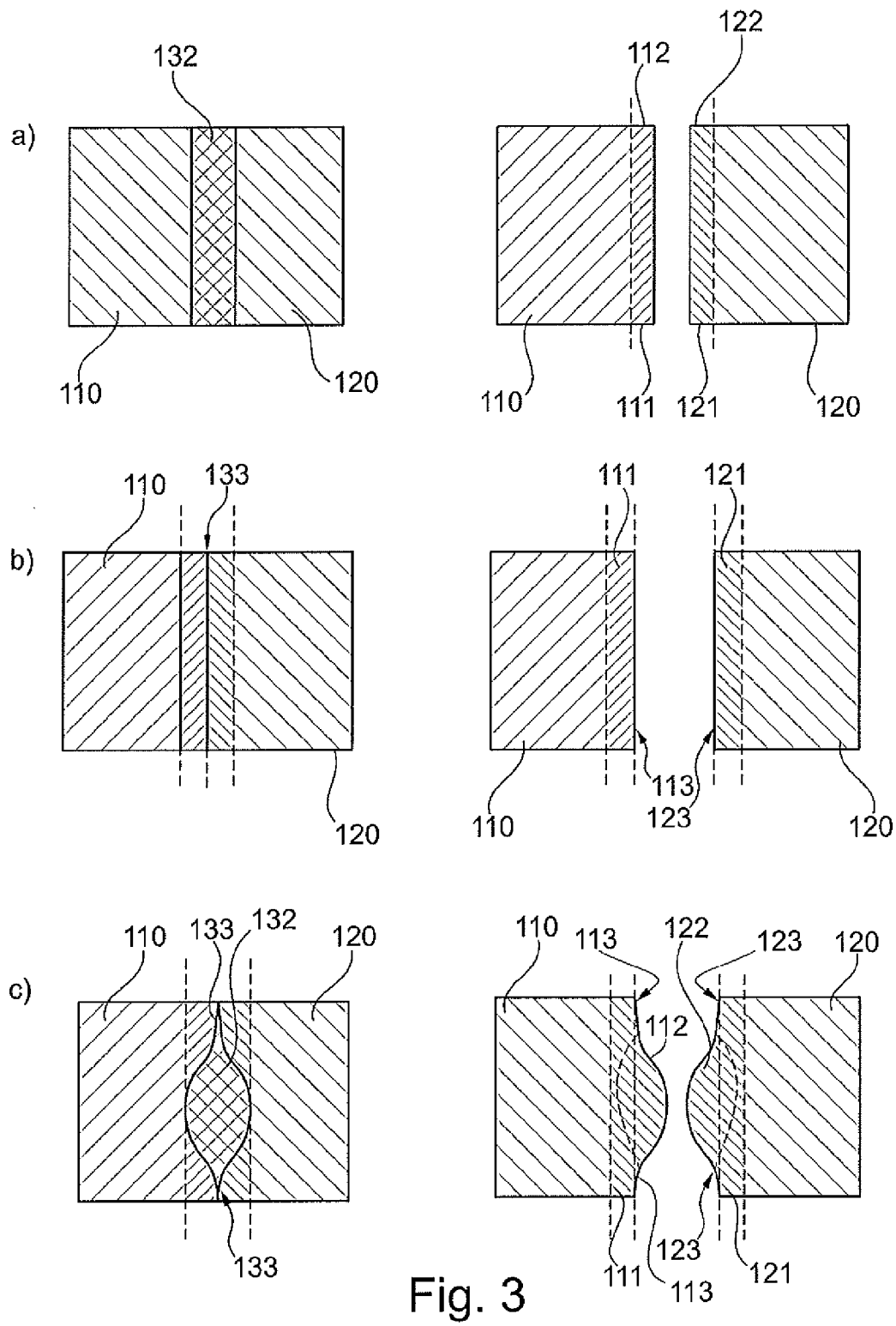
FIG. 3 shows various embodiments of adjacent partial images.

FIG. 3 shows various exemplary embodiments of boundary regions of two adjacent partial images 110, 120. In the example designated a.), the boundary regions 111, 121 of the partial images 110, 120 overlap, as a result of which these have a coincident region 112, 122 each. In this arrangement the coincident region 112 forms part of the partial image 110, while the coincident region 122 forms part of the partial image 120. Such an overlap 132 provides an advantage in that matching of the partial images can be achieved on both sides, in particular in relation to the intensity of the illumination, as will be further described in detail with reference to FIG. 4.

The exemplary embodiment designated b.) shows two adjoining partial images 110, 120, wherein in this embodiment there is, however, no overlapping region of the boundary regions 111, 120 but only an adjoining region 133. In this arrangement in this adjoining region 133 the two matching regions 113, 123 of the already matched partial images 110, 120 abut. In this case in the boundary region 111, 120 there is an adaptation such that in the matching regions 113, 123 that represent the adjoining region 133, for example, contours of the overall image presentation are continued so that continuation of the overall image content can be achieved without any break. While the embodiment designated a.) makes possible easier matching, for example in the form of a gradual transition, such a gradual transition is not easily possible in the embodiment designated b.). However, there is the possibility that in the case of the embodiment designated b.), due to the redundant overlap, the overall image needs to be separated into a smaller number of partial images, so that while the overall projection surface is retained a smaller number of partial images and thus projectors is required.

Of course, matching the boundary region can also take place in a mixed form of the embodiments designated a.) and b.), with such a mixed form being designated c.). Such boundary region matching is required, in particular, when projection takes place onto a projection area comprising curvatures of different radii so that curvature of the boundary line region is to be expected. In this embodiment the boundary region 111, 121 comprises both matching regions 113, 123 that represent a continuation of the image content, and a region of overlap 112, 122 in which the image contents overlap. There is thus a mixed form of an adjoining region 133 and a region of overlap 132.

Figure 4:
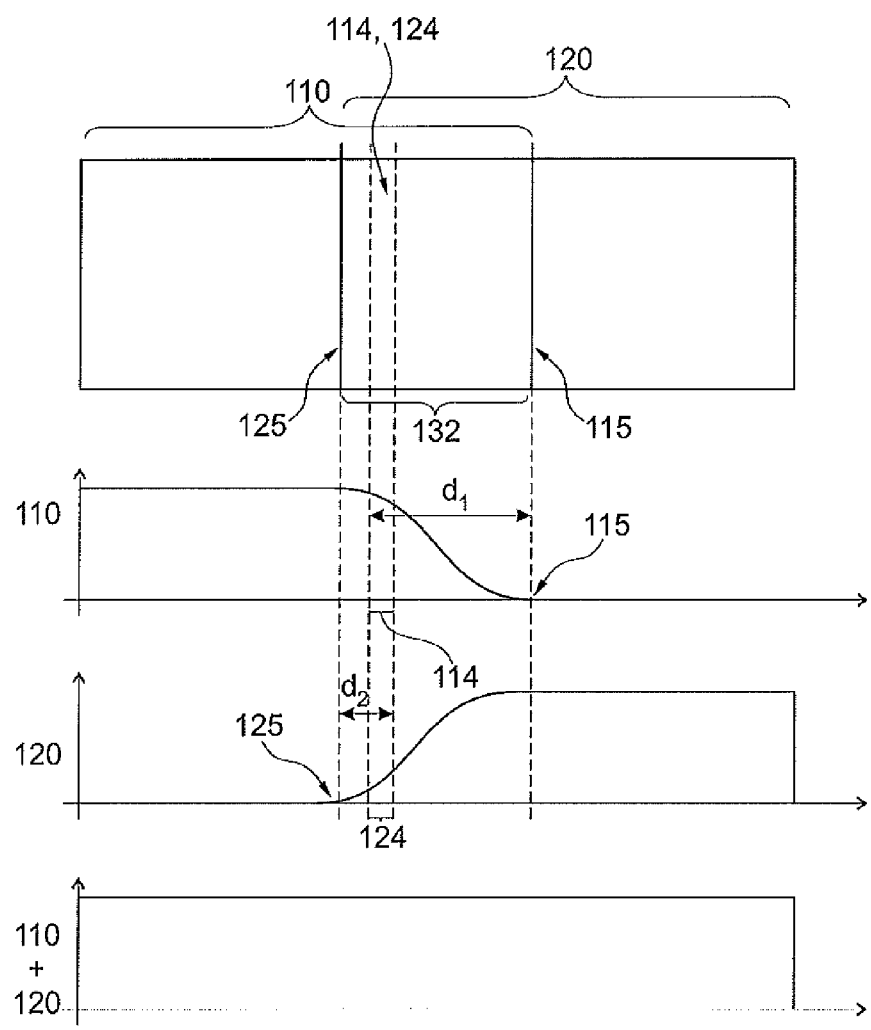
FIG. 4 shows a different degree of matching, depending on the space between partial boundary regions and an associated partial image margin.

FIG. 4 shows an exemplary embodiment of the present invention, in which the two partial images 110, 120 overlap. As a result of dual illumination in the region of overlap 132, for example in the case of even illumination intensity in the region of overlap, double illumination occurs that would produce a bright strip in the region of overlap 132. In the embodiment shown, the boundary regions 111, 121 are matched to each other such that the degree of matching takes place depending on a distance from the partial boundary regions 114, 124 to an associated partial image margin 115, 125. An intensity diagram related to the partial image 110 shows that the intensity for illumination of the partial image is constant up to the region of overlap, and then tapers off continuously over the region of overlap. To the same extent the intensity of the partial image 120 is reduced over the region of overlap 132, until the intensity of the partial image 120 outside the region of overlap is kept at a constant level. The partial boundary region 114, which forms part of the partial image 110, is spaced apart from the partial image margin 115, which forms part of the partial image 110, by the distance d1. The partial image region 124 is spaced apart from the associated partial image margin 125 of the partial image 120 by the distance d2. In this arrangement the degree of matching can take place depending on the spacing d1 and d2. In this way, as shown in an exemplary manner in the figure with reference to intensity, matching can take place depending on the spacing d1, d2 of partial image regions 114, 124 from an associated partial image margin 115, 125. Thus, as shown in the lower diagram, the intensity can essentially be kept constant across the entire presentation width of the two partial images 110, 120 together.

It is understood that matching as shown in FIG. 4 as an example of the intensity can of course also occur in relation to matching of the image contents, contours and colours. In this arrangement it is not mandatory for the region of matching to be continuous; instead it can also comprise steps. As an alternative, any form of a matching curve in the region of overlap 132 is imaginable, for example a ramp, a step or a gradually rising curve, wherein it is of course also possible to carry out matching in which there is no monotonic gradient. The matching curve can also be set to be interactive, based on the image contents to be presented.

Figure 5:
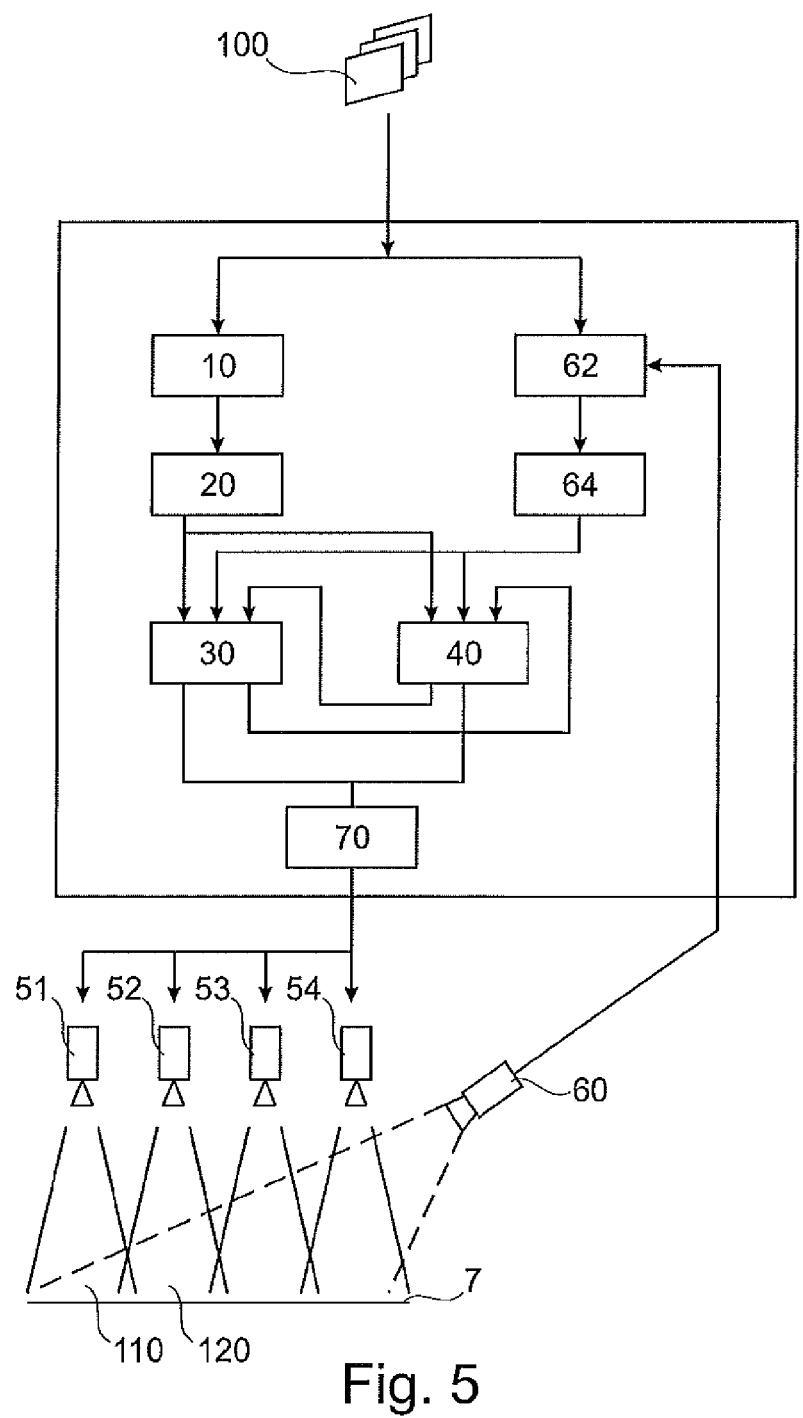
FIG. 5 shows a projection device according to an exemplary embodiment of the invention.

FIG. 5 shows an exemplary embodiment of the projection device. The projection device shown in FIG. 5 comprises a separation device 10 that is designed to separate an overall image 100 or a sequence of overall images 100. This overall image or these overall images is/are separated into at least two partial images 110, 120, wherein, of course, separation into more than two partial images can also take place. After separation of the partial images, in the embodiment shown in FIG. 5 a determination of the boundary regions takes place by a determination device 20 that is designed to determine a boundary region 111, 121 of each of at least two partial images 110, 120. Based on the boundary regions determined in the determination device 20, a matching device 30 can match the boundary regions to each other such that, when the partial images are presented, a transition between the partial images is perceptible only to a reduced extent or is no longer perceptible at all. The partial images with matched boundary regions can then be pre-distorted in a pre-distortion device 40 such that when the partial images are projected onto a projection area the partial images shown are presented with reduced distortion or with no distortion. In this arrangement, it is possible for matching to be followed by pre-distortion, or alternatively for pre-distortion to be followed by matching. Although not shown in FIG. 5, a partial image can also be subjected to pre-distortion before the boundary regions are determined in the determination device 20. In this case the partial images are fed from the output of the separation device 10 to the pre-distortion device 40, wherein they are subsequently fed from the pre-distortion device 40 to the determination device 20, which for reasons of clarity is, however, not shown in detail in FIG. 5.

In the embodiment of the projection device as shown in FIG. 5, furthermore, a pixel matching device 70 is provided in order to match the pixel resolution of an image to the pixel resolution of a projector.

The partial images whose boundary regions have been matched, and the pre-distorted partial images are subsequently conveyed to projectors 51, 52, 53, 54 that project the individual partial images such that in an ideal case an overall image appears on the projection area 7, which overall image essentially corresponds to the overall image 100 that serves as a basis for processing.

Furthermore, an acquisition device 60 can be provided which acquires the entire projection of the partial images and supplies it to a comparison device 62 which compares the entire projection of the partial images to the overall image 100 in order to, on this basis, drive a regulating device 64 which in turn intervenes in a regulating manner with the boundary-region matching device or the pre-distortion device. Furthermore, the regulating device 64 can also intervene in a regulating manner with a positioning device (not shown), which correspondingly regulates the position of the partial images 110, 120 projected by the projectors 51, 52, 53, 54, so that apart from a boundary region matching correction and a pre-distortion correction it is also possible to carry out a position correction. In this arrangement the acquisition device 60 can be arranged such that it frontally acquires the entire projection. However, the acquisition device 60 can also acquire the projection from an oblique angle. In this case, distortion rectification of the acquired image may be necessary.

According to one embodiment, the projection device is designed to repeatedly and in an image-precise manner process each one of a sequence of overall images 100 such that synchronised overall image presentation takes place. In this way it is possible to present, over a large area by the projection device, not only static images but also films that essentially comprise a sequence of overall images.

Figure 6:
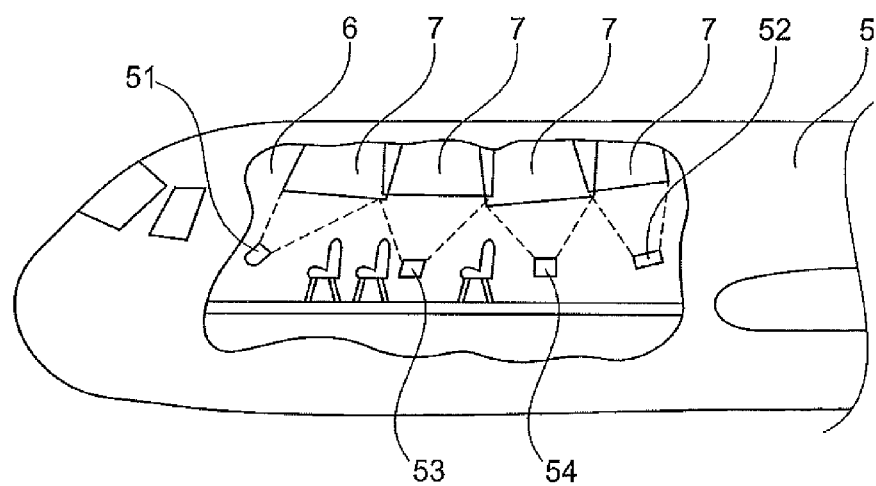
FIG. 6 shows an aircraft comprising a projection device according to an exemplary embodiment of the invention.

FIG. 6 shows an exemplary embodiment of an aircraft or an aeroplane with a diagrammatic view of the projection device. In the cabin region of an aircraft 5 a projection device is provided, with the projectors 51, 52, 53, 54 which according to this embodiment are associated with said projection device being provided in a cabin region, in order to project partial images onto the interior walls 6 of the cabin. The partial images are projected onto projection areas 7. The embodiment shown in FIG. 6 is only a diagrammatic view; in particular, the projectors 51, 52, 53, 54 can also be arranged in the region of the hatracks. In an aircraft there is a particular difficulty in that, as a rule, the distances to the projection area are comparatively short as a result of the limited cabin space, and in that, due to the curved interior surfaces that form part of the geometric shape of the projection area 7, pre-distortion has to be carried out that goes beyond pre-distortion required to compensate for the keystone effect. In particular, such projection areas are frequently two areas with a concave curvature in two spatial directions, which projection areas require intensive calculation of the pre-distortion.

It should be noted that the present invention can also be used in other vehicles, for example in trains, buses or ships.

It should be pointed out that "comprising" does not exclude other elements or method-related steps, and "a" or "an" does not exclude a plural number.

The reference characters used serve only to provide a better understanding, and should in no way be interpreted as being limiting, wherein the scope of protection of the invention is defined by the claims.

The invention claimed is:

1. A projection method for projecting an overall image to interior walls of an aircraft, comprising:
   (1) determining a boundary region of each one of at least two partial images of an overall image;
   (2) matching the boundary regions to each other wherein in the case of matching the boundary regions matching takes place to a degree that depends on the distance between partial boundary regions and an associated partial image margin such that in a presentation of the partial images the transition between the partial images is perceptible only to a reduced extent; and
   (3) pre-distorting the partial images on the basis of the geometric shape of a projection area so that when the partial images are presented on the projection area distortion is perceptible only to a reduced extent;
   acquiring the entire projection of the partial images;
   comparing the entire projection of the partial images with the overall image; and
   controlling at least one of the processes of matching the boundary regions, positioning the partial images, or pre-distorting the partial images, such that the entire projection of the partial images is matched to the overall image.

2. The projection method of claim 1, further comprising separating an overall image into at least two partial images.

3. The projection method of claim 1, wherein matching the boundary regions takes place prior to pre-distorting the partial images.

4. The projection method of claim 1, further comprising projecting the partial images onto a projection area, wherein each partial image is projected with an associated projector.

5. The projection method of claim 1, wherein in each case the at least two partial images have a coincident region, and the coincident region forms part of the boundary region so that the boundary region at least in part is a region of overlap.

6. The projection method of claim 1, wherein the at least two partial images each comprises a matching region, wherein the matching regions are a continuation of the image content, and the matching region forms part of the boundary region so that the boundary region at least in part is a joining region.

7. The projection method of claim 1, further comprising repeating steps (1) through (3) in an image-precise manner with each one of a sequence of overall images such that a synchronized overall image presentation is made possible.

8. The projection method of claim 1, further comprising matching a pixel resolution of an image to a pixel resolution of a projector.

9. A computer-readable storage medium comprising a program element stored thereon, said program element which, when executed on a processor implements a method comprising:
   determining a boundary region of each one of at least two partial images of an overall image;
   matching the boundary regions to each other wherein in the case of matching the boundary regions matching takes place to a degree that depends on the distance between partial boundary regions and an associated partial image margin such that in a presentation of the partial images the transition between the partial images is perceptible only to a reduced extent;
   pre-distorting the partial images on the basis of the geometric shape of a projection area so that when the partial images are presented on the projection area distortion is perceptible only to a reduced extent;
   acquiring the entire projection of the partial images;
   comparing the entire projection of the partial images with the overall image; and
   controlling at least one of the processes of matching the boundary regions, positioning the partial images, or pre-distorting the partial images, such that the entire projection of the partial images is matched to the overall image.

10. A projection device for projecting an overall image onto interior walls of an aircraft, comprising:
    a determination device;
    a matching device; and
    a pre-distortion device;
    an acquisition device;
    a comparison device; and
    a regulating device;
    wherein the determination device is configured to determine a boundary region of each one of at least two partial images of an overall image;
    wherein the matching device is configured for matching the boundary regions to one another and wherein the matching device is configured to match the boundary regions to a degree of matching that depends on a distance between partial boundary regions and an associated partial image margin such that in the presentation of the partial images the transition between the partial images is perceptible only to a reduced extent; and
    wherein the pre-distortion device is configured to pre-distort the partial images based on the geometric shape of a projection area such that in the presentation of the partial images on the projection area distortion is perceptible only to a reduced extent;
    wherein the acquisition device is configured to acquire the entire projection of the partial images;
    wherein the comparison device is configured to compare the entire projection of the partial images to the overall image; and
    wherein the regulating device is configured to regulate at least one of the devices of matching device or pre-distortion device or a positioning device for partial images in order to match the entire projection of the partial images in the overall image.

11. The projection device of claim 10, further comprising:
    a separation device,
    wherein the separation device is configured to separate an overall image into at least two partial images.

12. The projection device of claim 10, wherein the matching device is arranged upstream of the pre-distorting device.

13. The projection device of claim 10, further comprising a number of projectors,
wherein the number of projectors corresponds to the number of partial images.

14. The projection device of claim 10, wherein in each case the at least two partial images have a coincident region, and the coincident region forms part of the boundary region so that the boundary region at least in part is a region of overlap.

15. The projection device of claim 10, wherein the at least two partial images each comprises a matching region, wherein the matching regions are a continuation of the image content, and the matching region forms part of the boundary region so that the boundary region at least in part is a joining region.

16. The projection device of claim 10, wherein the projection device is configured to repeatedly process in an image-precise manner each one of a sequence of overall images such that a synchronised overall image presentation takes place.

17. The projection device of claim 10, further comprising a pixel matching device for matching a pixel resolution of an image to a pixel resolution of a projector.

18. An aircraft comprising a projection device comprising:
a determination device;
a matching device; and
a pre-distortion device;
an acquisition device;
a comparison device; and
a regulating device;
wherein the determination device is configured to determine a boundary region of each one of at least two partial images of an overall image;
wherein the matching device is configured for matching the boundary regions to one another and wherein the matching device is configured to match the boundary regions to a degree of matching that depends on a distance between partial boundary regions and an associated partial image margin such that in the presentation of the partial images the transition between the partial images is perceptible only to a reduced extent; and
wherein the pre-distortion device is configured to pre-distort the partial images based on the geometric shape of a projection area such that in the presentation of the partial images on the projection area distortion is perceptible only to a reduced extent;
wherein the acquisition device is configured to acquire the entire projection of the partial images;
wherein the comparison device is configured to compare the entire projection of the partial images to the overall image; and
wherein the regulating device is configured to regulate at least one of the devices of matching device or pre-distortion device or a positioning device for partial images in order to match the entire projection of the partial images in the overall image.

\* \* \* \* \*